United States Patent [19]

Reeve

[11] 4,204,614

[45] May 27, 1980

[54] FLUID DISPENSER HAVING A SPRING BIASED LOCKING MECHANISM FOR A SAFETY NOZZLE CAP

[75] Inventor: Randy F. Reeve, Walnut, Calif.

[73] Assignee: Diamond International Corporation, New York, N.Y.

[21] Appl. No.: 946,616

[22] Filed: Sep. 28, 1978

[51] Int. Cl.² .................................................. B67D 5/32
[52] U.S. Cl. ..................................... 222/153; 215/209; 222/207; 222/383; 222/521; 239/600
[58] Field of Search ................... 222/153, 206–215, 222/383, 402.11, 562, 563, 521; 220/288; 215/209, 216–218, 221; 239/600

[56] References Cited

U.S. PATENT DOCUMENTS

| | | |
|---|---|---|
| 3,233,769 | 2/1966 | Jessop . |
| 3,700,133 | 10/1972 | Bagguley ............................ 215/221 |
| 3,913,804 | 10/1975 | Laauwe ........................ 222/402.11 X |
| 3,984,021 | 10/1976 | Uhlig ..................................... 215/216 |
| 3,990,639 | 11/1976 | Laauwe ........................ 222/402.11 X |
| 3,995,774 | 12/1976 | Cooprider ........................ 222/383 X |

*Primary Examiner*—Robert J. Spar
*Assistant Examiner*—Fred A. Silverberg

*Attorney, Agent, or Firm*—Watson, Cole, Grindle & Watson

[57] ABSTRACT

A fluid dispenser includes an actuator containing fluid passages defining a discharge path for fluid from a supply container to a discharge orifice, a needle valve lying adjacent the discharge path, a nipple surrounding the needle valve and a nozzle cap having an end wall containing a discharge orifice and being threadedly engaged with the nipple for movement of the end wall toward and away from the valve upon cap rotation. Discharge through the orifice may be positively shut-off upon rotation of the cap which causes the valve to be seated against the discharge orifice, and the nozzle cap may be locked in an off position upon engagement between a spring biased tab provided on the actuator and an inwardly extending shoulder provided on the skirt of the cap. A ramp member on the cap includes a ramp surface and the shoulder so as to effect inward deflection of the tab upon engagement with the ramp surface during cap rotation toward the off position. The tab then snaps into place against the shoulder upon continued cap rotation so as to prevent rotation of the cap which would cause the valve to unseat from the discharge orifice. The tab is manually deflectable for disengaging it from the shoulder to permit cap rotation allowing its end wall to move away from the valve.

4 Claims, 10 Drawing Figures

U.S. Patent  May 27, 1980  Sheet 1 of 2  4,204,614
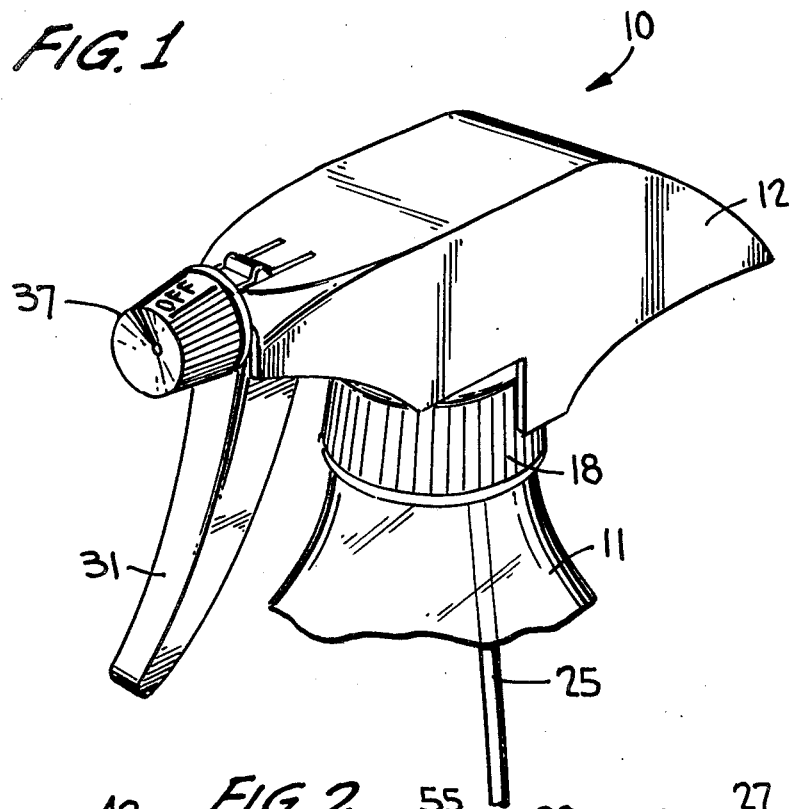
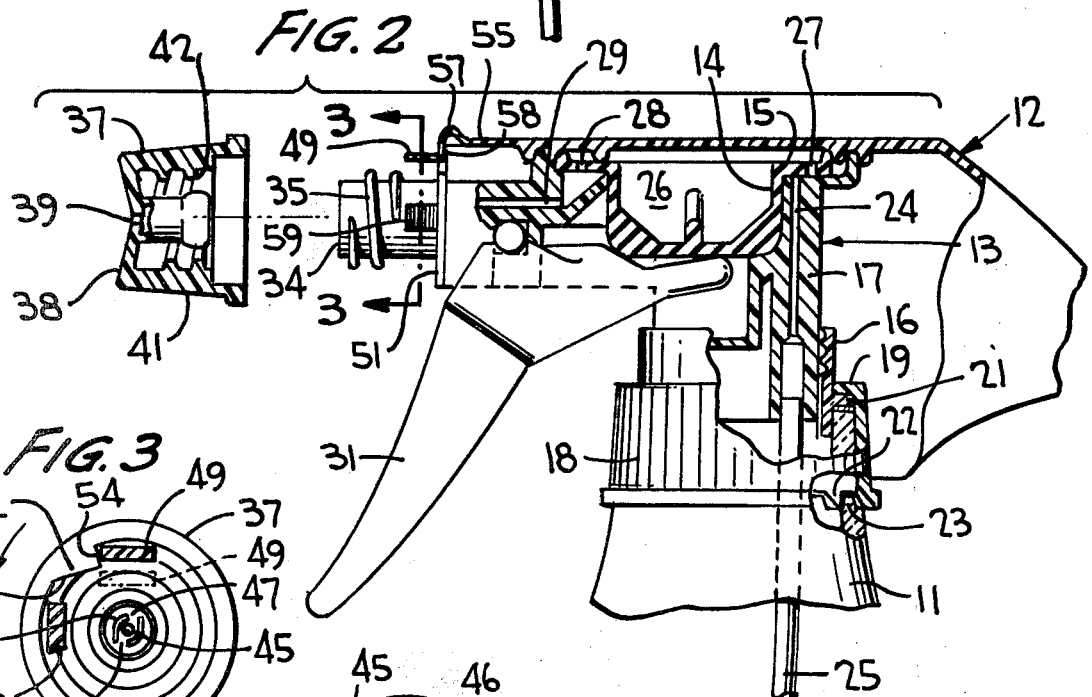
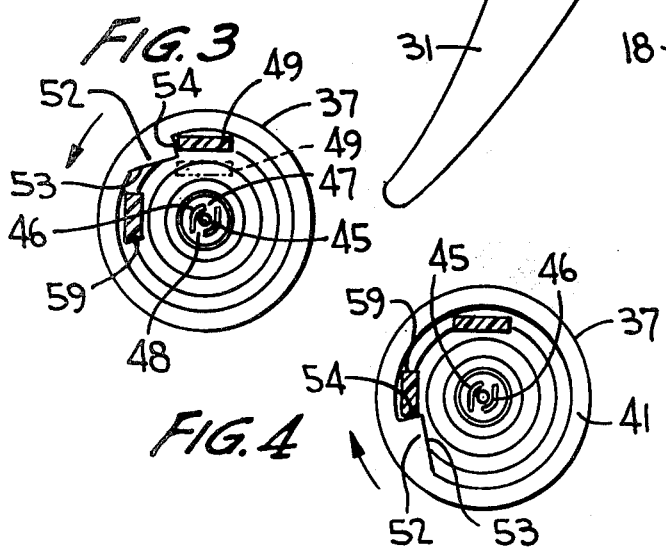

U.S. Patent May 27, 1980 Sheet 2 of 2 4,204,614
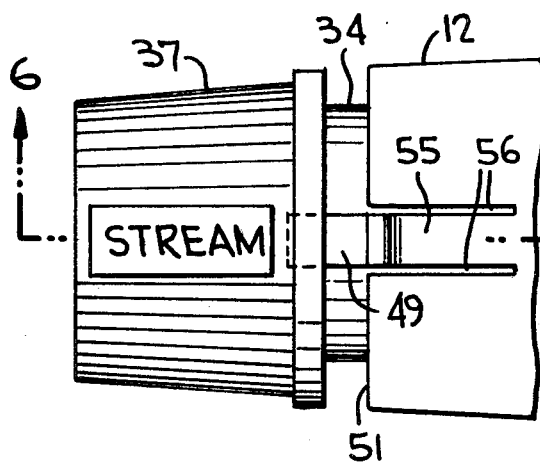
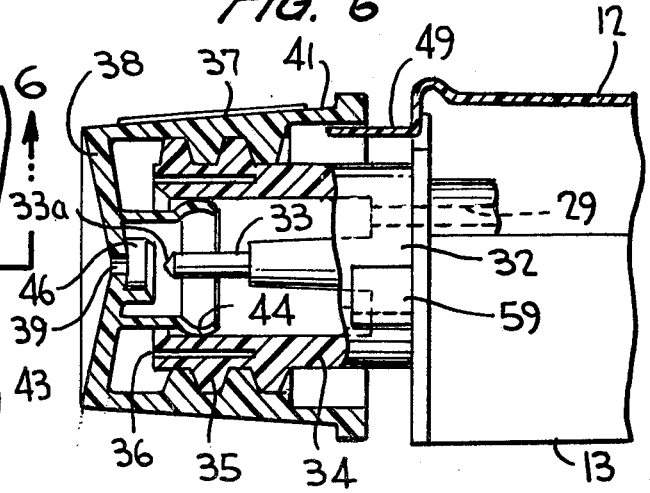
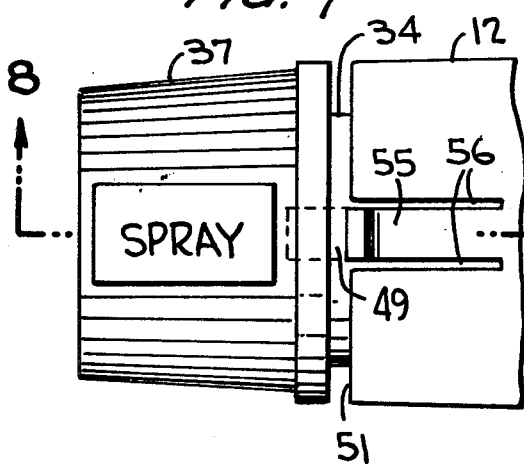
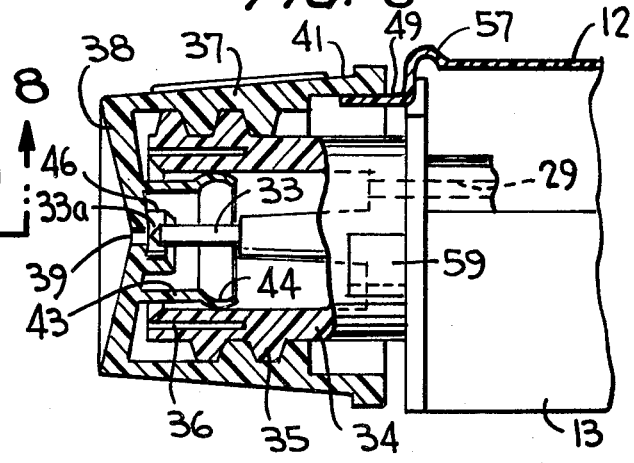
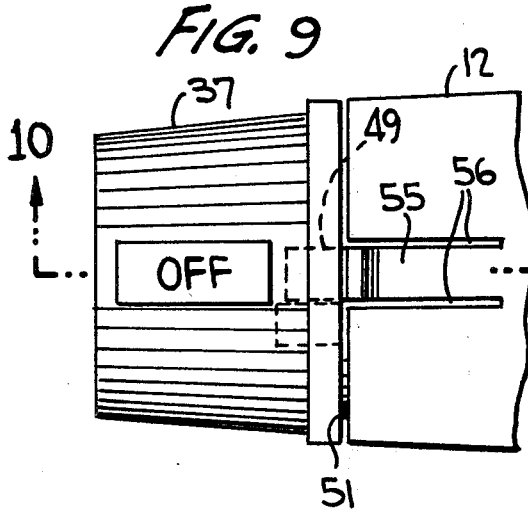
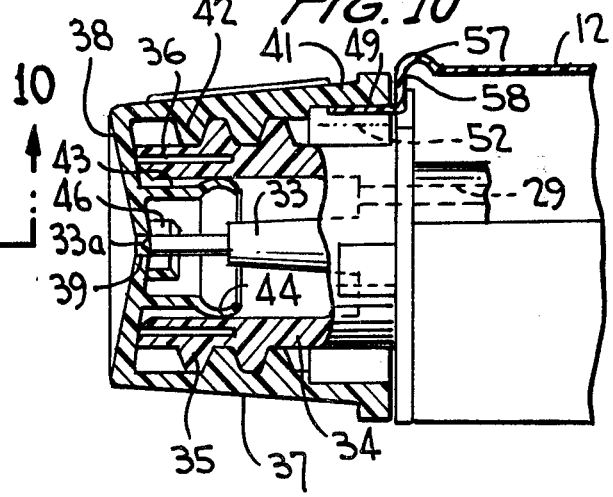

FLUID DISPENSER HAVING A SPRING BIASED LOCKING MECHANISM FOR A SAFETY NOZZLE CAP

BACKGROUND OF THE INVENTION

This invention relates generally to a fluid dispenser having a rotatable nozzle cap containing a discharge orifice, and more particularly to means for locking the cap against rotation while in a shut-off position.

A fluid dispenser or actuator is disclosed in U.S. Pat. No. 3,990,639 as including a needle valve adjacent a fluid discharge path, a nipple surrounding the valve and a nozzle cap threaded on the nipple. The discharge orifice is located in an end wall of the cap, and is capable of being seated against the tip of the valve upon cap rotation inwardly toward the valve. Discharge through the orifice is therefore positively shut-off during such seated engagement.

A similar construction is likewise disclosed in U.S. Ser. No. 857,415, commonly owned herewith, and directed to a pattern fluid spray means in which the discharge is capable of being positively shut-off as a nozzle cap is rotated on a nipple for seating the tip of a needle valve against the discharge orifice located in the cap.

However, if the nozzle cap becomes only slightly unscrewed, inadvertent discharge of product may possibly occur during shipment or storage of the dispenser. And, a young child is capable of discharging the product upon actuation of the dispenser.

Many safety devices for screw-cap containers have been provided for preventing accidental removal of the cap from the container. U.S. Pat. No. 3,233,769 discloses one such device as providing a ramp extending outwardly of the neck of the container for cooperation with a projection member on the cap so as to lock the cap in a fully closed condition. However, such design is not readily adaptable for locking a nozzle screw-cap in an off position on a fluid dispenser because of the relatively cumbersome design of this prior art safety cap. Moreover, the projection member cannot be conveniently deflected for disengaging it from the ramp member to facilitate cap removal.

SUMMARY OF THE INVENTION

It is therefore an object of the present invention to provide a simple and economical locking mechanism which can be easily manipulated yet is highly effective in locking a safety cap for a fluid dispenser in its off position as the discharge orifice located in the cap end wall is removed into seating engagement with the tip of a needle valve upon cap rotation. A locking tab provided on the dispenser is made easily deflectable by the operator for unlocking the nozzle cap to facilitate dispensing of product.

The means for locking the nozzle cap in an off position comprises a ramp member projecting inwardly of the cap's annular skirt, and a spring biased tab on the actuator engaging a shoulder provided on the ramp member at a fully rotated position of the cap into an off position of the dispenser. The tab extends parallel to the needle valve of the dispenser, and is deflected inwardly as it slidingly engages a sloping surface of the ramp member until it snaps into an engaged position with the shoulder. The tab is made integral with a plate spring defined by a pair of spaced slits located in the actuator, and an outwardly extending portion of the plate spring permits the tab to be manually deflected inwardly for disengaging it from the ramp member shoulder to permit the cap to be rotated from its off position.

Other objects, advantages and novel features of the invention will become more apparent from the following detailed description of the invention when taken in conjunction with the accompanying drawings.

BRIEF DESCRIPTION OF THE DRAWINGS

FIG. 1 is a perspective view of a trigger actuated dispenser incorporating the safety nozzle cap according to the invention;

FIG. 2 is a side elevational view, partly in section and expanded, to the FIG. 1 assembly;

FIG. 3 is a sectional view taken substantially along line 3—3 of FIG. 2 and showing the cap in a locked OFF position of the dispenser;

FIG. 4 is a view similar to FIG. 3 except that the cap is shown in a fully open or STREAM position;

FIGS. 5, 7 and 9 are respectively top plan views of the nozzle cap in relation to a portion of the dispenser housing, the cap being respectively shown in STREAM, SPRAY and OFF positions; and FIGS. 6, 8 and 10 are sectional views taken substantially along lines 6—6, 8—8, and 10—10 of FIGS. 5, 7 and 9, respectively.

DETAILED DESCRIPTION OF THE INVENTION

Turning now to the drawings wherein like reference characters refer to like and corresponding parts throughout the several views, a trigger-actuated fluid dispenser generally designated 10 is shown in FIG. 1 incorporating a safety nozzle cap according to the invention and typically mounted on the neck of a container 11. The dispenser is in the form of an actuator such as a pump housing of the same type shown in commonly owned U.S. Pat. No. 4,138,038, the construction and operation of the pump chamber being specifically incorporated herein by reference. All the details of the pump housing will therefore not be repeated. Briefly the actuator is comprised of upper and lower housing members 12 and 13 having a bulb diaphragm 14 with its annular encircling flange 15 in fluid-tight engagement with the housing members. A ring 16 is press-fitted on the lower end of a plug 17 of the lower housing member by means of cooperating annular ribs, and a screw cap 18, having an inner annular flange 19 overlying an outer annular flange 21 provided on ring 16 (see FIG. 2), is threaded onto the neck of the container for mounting the pump housing in place. Ratchet teeth 22 may be provided continuously along the inner bottom end of the screw cap for cooperation with upstanding teeth 23 provided on the neck of the container. Thus, the screw cap may be tightened in a clockwise direction onto the container whereby engagement between teeth 22,23 prevents removal of the screw cap in a counter-clockwise turning direction. Otherwise, the screw cap may be welded or otherwise positively secured in place to prevent inadvertent removal thereof.

An inlet passage 24 communicates with the interior of the container via a dip tube 25, the passage being opened upon movement of flange 15 away therefrom for filling a pump chamber 26 through inlet opening 27 provided in flange 15. The pump chamber is defined by a central dome portion of the bulb diaphragm and upper housing member 12, and an outlet opening 28 in flange 15 permits outward fluid flow through a discharge passage 29 as a portion of flange 15 adjacent the outlet opening is deflected under fluid pressure downwardly toward the discharge passage upon actuation of trigger 31, all as shown and described in detail in commonly owned U.S. Pat. No. 3,995,774.

As shown in FIGS. 6, 8 and 10, lower housing member 13 has a nozzle end 32 with an elongated needle valve 33 projecting outwardly thereof. A hollow nipple 34, externally threaded as at 35, surrounds the needle valve, and has an annular open slot 36 adjacent its outer end. Discharge passage 29 opens into the interior of nipple 34 through nozzle end 32.

A nozzle cap 37 has an end wall 38 containing a centrally located discharge orifice 39 disposed co-axially with the needle valve when the nozzle cap is threaded in place. An annular skirt 41 of the nozzle cap is internally threaded as at 42 for threaded engagement with threads 35 of nipple 34. A sleeve 43 extends inwardly of end wall 38 and is slightly bulged at its free end as at 44, the sleeve being relatively flexible compared to that of the more rigid remainder of the cap. Bulged end 44 bears against the inner wall of the nipple (FIGS. 6, 8 and 10) when the cap is threaded onto the nipple. Annular slot 36 of the nipple renders this otherwise rigid element slightly flexible so as to effect a tight seal between sleeve 43 and the nipple when the cap is threaded in place.

A pair of arcuate flanges 45,46 are mounted on the inner surface of end wall 38 and extend a short distance toward the needle valve. These arcuate walls define a swirl chamber surrounding the discharge orifice, and present tangential slots 47,48 (FIG. 3) therebetween so that, when fluid is forced into the swirl chamber through these slots, it is caused to rapidly whirl adjacent the discharge orifice before it is discharged outwardly therethrough.

Thus, when the nozzle cap is in threaded engagement with the nipple but at its remotest position (FIGS. 5,6) from the housing members, tip 33a of the needle valve is spaced axially from the swirl chamber defined by arcuate flanges 45, 46, so that fluid flow from the discharge passage through the nipple and through sleeve 43 discharges through orifice 39 in a linear stream since it is directed linearly through the discharge orifice. In order to assist the operator for stream spraying, the nozzle cap may be provided with a STREAM indicator on its outer surface (see FIG. 5) positioned so as to align with a spring biased tab 49 extending outwardly of an edge 51 of the upper housing member. Rotation of the nozzle cap, in the direction of the arrow of FIG. 3, causes the discharge orifice to be moved toward the needle valve whereby its tip 33a is disposed within the swirl chamber, as shown in FIG. 8. The fluid exiting passage 29 therefore enters the swirl chamber via tangential slots 47,48 since the needle valve is so dimensioned as to plug the inner open end of arcuate flanges 45,46. Thus, the swirling fluid within the chamber exits the discharge orifice in a fine mist spray. The nozzle cap may be provided with a SPRAY indicator (FIG. 7) so positioned as to be aligned with tab 49 when the nozzle cap is rotated into its SPRAY position.

Upon completely tightening the nozzle cap onto the nipple during further rotation thereof, in the direction of the arrow of FIG. 3, the discharge orifice is moved relative to the needle valve such that tip 33a thereof is seated tightly against the wall opening defining the discharge orifice, as shown in FIG. 10. Fluid discharge is therefore positively prevented in this shut-off position. Thus, no product can escape from the container during storage or shipment of a dispensing pump package incorporating the present nozzle cap arrangement, and inadvertent discharge is positively prevented when the present nozzle cap is used with an aerosol actuator having a swirl chamber and a tip sealing feature as in the aforementioned U.S. Pat. No. 3,990,639.

The locking mechanism according to the invention, provided for locking the nozzle cap in the dispenser shut-off position of FIGS. 9 and 10, comprises cooperating means on the nozzle cap and the upper housing member. Such cooperating means includes a ramp member 52 located on the inner surface of skirt 41 of the nozzle cap and projecting inwardly thereof. The ramp member has a ramp surface 53 and an inwardly extending radial surface defining a shoulder 54.

The locking mechanism further comprises spring biased locking tab 49 projecting outwardly of edge 51 of the upper housing member and extending toward the nozzle cap. Tab 49 lies parallel to the needle valve in its relaxed position and is integral with a plate spring 55 defined by a pair of spaced slits 56 located in housing member 12. Slits 56 are spaced relatively closed to one another so as to assure the resiliency of the plate spring formed in the upper housing member typically made of a stiff plastic material of relatively thin gauge. The plate spring has an upwardly extending hump 57 and an inwardly extending leg 58 integral with the locking tab. As seen in FIGS. 3, 4, 6, 8 and 10, the locking tab initially lies in engagement with the inner surface of skirt 41 of the nozzle cap.

A stop element 59 extends radially outwardly from a side of nipple 34 and is so disposed as to prevent further rotation of the nozzle cap in the direction of the arrow of FIG. 4 beyond the position shown therein so as to prevent the nozzle cap from being completely unthreaded off the nipple. Engagement between shoulder 54 of the ramp member and stop element 59 prevents outward movement of the nozzle cap beyond that shown in FIGS. 5,6.

Ramp 52 on skirt 41 is radially spaced a slight distance relative to the OFF setting on the cap. The ramp member is so positioned that its shoulder 54 will bear against an edge of locking tab 49 when the nozzle cap is rotated in the direction of the arrow of FIG. 3, i.e., in a clockwise turning direction whereupon the nozzle cap is tightened on the nipple so as to move wall 38 of the nozzle cap toward the needle valve until tip 33a of the valve seats against the discharge orifice in an off position of FIGS. 9 and 10. Surface 53 of the ramp member is in the form of a ramp of progressively decreasing radial extent from the axis of rotation of the nozzle cap, so that upon rotation of the cap in a tip sealing direction, locking tab 49 is progressively deflected inwardly with little effort and without the need for manual deflection thereof. Of course, as the locking tab engages ramp surface 53 and is gradually deflected inwardly, it snaps outwardly back into its position shown in FIG. 3 at which an edge thereof abuts against shoulder 54. The dispenser is therefore rendered essentially child resistant in that the nozzle cap is locked in an off position preventing any dispensing of product through the discharge orifice regardless of manipulation of trigger actuator 31. Also, inadvertent actuation and discharge of product is prevented during storage and shipment. The cap may nevertheless be unlocked from its position of FIGS. 9 and 10 by manually depressing the locking tab so as to deflect it inwardly to its phantom outline position of FIG. 3 away from shoulder 54 of the ramp member to permit the nozzle cap to be rotated in the direction of the arrow of FIG. 4. Such manual deflection is carried out by pressing against hump 57 which extends outwardly of the upper housing member. Thus, a young child will normally by incapable of unlocking the nozzle cap without specific instructions to inwardly deflect the locking tab and to maintain it inwardly deflected a sufficient amount to permit rotation of the nozzle cap in a loosening direction. Also, plate spring 56 may be made sufficiently strong and rigid as to require the strength of an adult to manipulate locking tab deflection.

From the foregoing it can be seen that a simple yet highly effective locking mechanism has been devised for locking a nozzle cap in an off position for rendering a fluid dispenser substantially child resistant, yet providing for easy unlocking of the nozzle cap when necessary.

Obviously, many other modifications and variations of the present invention are made possible in the light of the above teachings. It is therefore to be understood that within the scope of the appended claims, the invention may be practiced otherwise than as specifically described.

I claim:

1. A fluid dispenser of the type including a fluid actuator having a nozzle end and containing fluid passages defining a discharge path for fluid from a supply container to a discharge orifice, a needle valve lying adjacent said outlet passage and having a free end, a nipple surrounding said needle valve and extending outwardly of said nozzle end, a nozzle cap having an annular skirt in threaded engagement with said nipple for movement toward and away from said valve end upon cap rotation, said cap having an end wall containing said orifice, said cap being movable into an off position upon rotation thereof in one direction causing said end wall thereof to move toward said valve until said valve end seats against said orifice thereby positively shutting-off discharge therethrough, and said cap being movable into a completely open position upon rotation in a direction opposite said one direction causing said end wall to move away from said valve, the improvement wherein one of said cap and said actuator has a ramp member thereon projecting inwardly toward said valve, the other of said cap and said actuator having a spring-biased tab extending parallel to said valve, said ramp member having an inwardly directed radial surface defining a shoulder and having a surface sloping from said shoulder and defining a ramp, said tab deflecting inwardly toward said valve upon engagement with said ramp during the rotation of said cap toward said off position, whereafter said tab snaps into engagement with said shoulder during further rotation of said cap into said off position to thereby lock said cap in said off position, engagement between said tab and said shoulder preventing rotation of said cap which would cause said valve end to unseat from said orifice, said tab being manually deflectable inwardly toward said valve for disengaging said tab from said shoulder to facilitate rotation of said cap causing said end wall thereof to move away from said valve, and a stop element extending radially outwardly of said nipple, said shoulder engaging said stop element upon movement of said cap into said open position to thereby prevent said cap from moving beyond said open position away from said valve.

2. The dispenser according to claim 1, wherein said tab extends outwardly of said nozzle end, and said ramp member being disposed on an inner surface of said annular skirt, a plate spring integral with said tab and being located in said actuator, said spring being defined by a pair of spaced slits lying parallel to said valve.

3. The dispenser according to claim 1, wherein a portion of said tab extends outwardly of said actuator to facilitate manual deflection of said tab.

4. The dispenser according to claim 1, wherein said actuator includes opposed housing members and a bulb diaphragm forming a pump chamber with one of said housing members, said tab being integral with said one member and extending outwardly of an edge thereof, said ramp member being located on an inner surface of said annular skirt.

* * * * *